UNITED STATES PATENT OFFICE.

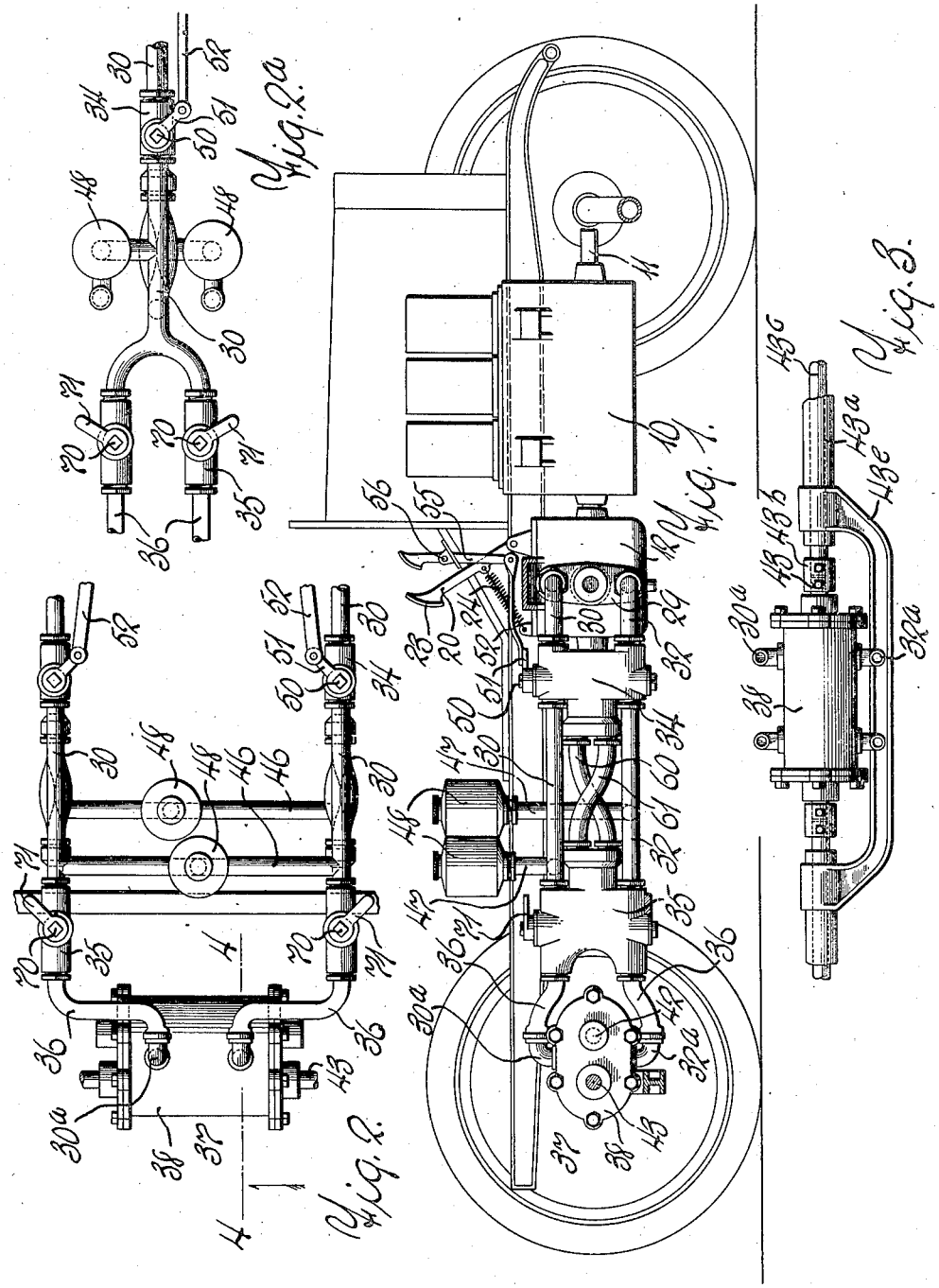

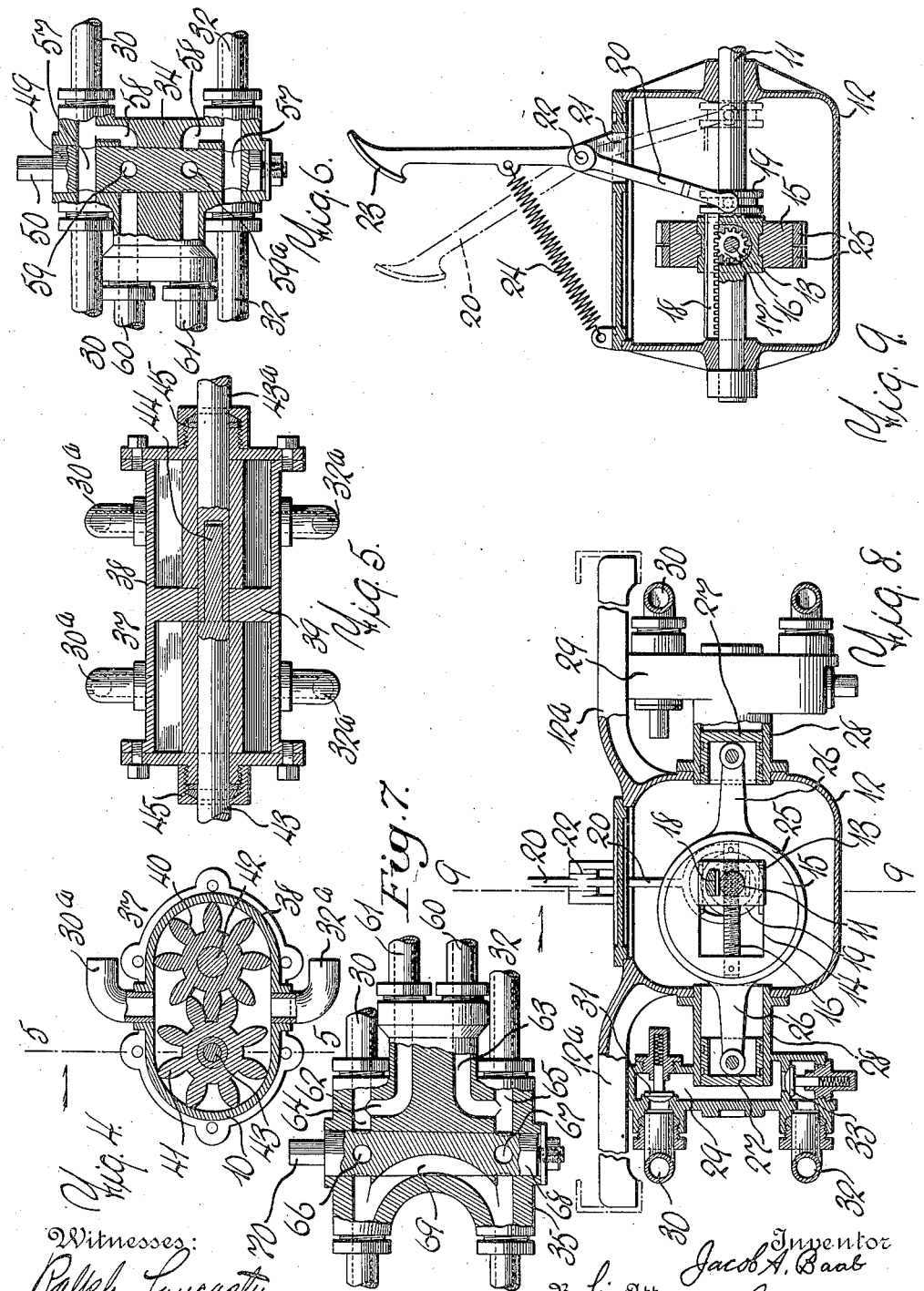

JACOB A. BAAB, OF NEW YORK, N. Y., ASSIGNOR OF ONE-HALF TO DANIEL ROHRER, OF NEW YORK, N. Y.

TRANSMISSION APPARATUS.

958,212.   Specification of Letters Patent.   Patented May 17, 1910.

Application filed August 28, 1908. Serial No. 450,706.

*To all whom it may concern:*

Be it known that I, JACOB A. BAAB, of the city, county, and State of New York, have invented a new and useful Improvement in Transmission Apparatus, of which the following is a full, clear, and exact description.

My invention relates to improvements in transmission apparatus, and the object of my invention is to improve the arrangement for power transmission usually applicable to automobiles, and also in other analogous devices, so that power may be transmitted from the prime motor to the driving axle without the use of the ordinary speed changers and without the use of gearing and belts or chains.

Another object of my invention, and the main object, is to substitute a liquid for the usual means of transmission, and drive the pump by the main motor, which will set the liquid in motion and so work a secondary pump or motor in connection with the driving axle, thus providing means for keeping the driving axle in motion by the circulation of the liquid. Thus by controlling the speed of the flow of the liquid, I control the speed of the transmission and of the vehicle or driving shaft.

I further provide means for reversing the flow and so reversing the direction of travel of the axle and the vehicle to which it is connected, and further I provide means for stopping the flow altogether without stopping the engine or motor, so that the vehicle is thus stopped.

It will be readily seen that by providing a liquid driven motor on the axle and a motor driven pump to circulate the liquid, I can get the speed in either direction, and as the liquid is not very elastic, I use air chambers in connection therewith to provide the necessary elasticity, such chambers operating like the chambers of a force pump.

My invention is also intended to provide a very convenient means for effecting the reversals of direction of the liquid without stopping the motor, and for cutting out the pump when desired by suitably arranged valves.

Reference is to be had to the accompanying drawings forming a part of this specification, in which similar reference characters indicate corresponding parts in all the views.

Figure 1 is a side elevation of the apparatus embodying my invention, showing the same applied to an automobile, the latter being shown in diagram. Fig. 2 is a broken plan view of the apparatus. Fig. 2ᴬ is a modification of the parts shown in Fig. 2. Fig. 3 is a rear elevation of the axle motor or gear pump. Fig. 4 is a cross section on the line 4—4 of Fig. 2, through the gear pump or axle motor. Fig. 5 is a section on the line 5—5 of Fig. 4. Fig. 6 is a detail sectional view of the valve used to reverse the liquid. Fig. 7 is a detail sectional view of the hand operated valve which is used to cut out either section of the axle motor. Fig. 8 is a detail of the pump and operating mechanism therefor, by means of which the liquid is circulated, and Fig. 9 is a cross section on the line 9—9 of Fig. 8.

I have shown my invention in detail, but the details can be varied greatly. As illustrated the transmission is operated from a prime motor 10 which can be a gas engine, electric motor, or any suitable form of motor, and this has the driving shaft or crank shaft 11 arranged to enter a casing 12, and the shaft 11 has fast thereon a block 13 which fits a slot 14 in the eccentric 15, so that the eccentric can slide on the block and thus change its center and change its throw in relation to the shaft 11. This change of eccentric can be conveniently made by a screw such as 16, the ends of which are secured to the eccentric, and the screw slides through the block 13 and has threaded thereon a pinion 17 which turns in a recess of the block (see Fig. 9) and engages a rack 18 which slides through the block and parallel with the shaft 11, the rack being operated from a sliding sleeve 19 which moves on the shaft and is connected to a forked lever 20, the latter extending upward through the slot 21 in the casing 12 and being fulcrumed at 22, while it is provided with a foot piece 23 and is normally pressed by the spring 24 so as to throw the rack forward and center the eccentric. It will be seen that by regulating the pressure on the pedal 23, the screw 16 can be moved to the necessary extent, and the eccentric 15 consequently thrown any desired distance off the center, so as to make its throw or thrust greater or less as desired. This thrust of the eccentric regulates exactly the flow of liquid in the transmission pipes, as presently described, and so by the lever 20 the speed of the driving axle hereinafter referred to can be nicely regulated. The eccentric straps 25 of the eccentric are connected by arms 26 with the pistons 27, which are opposed, and which operate in cylinders 28 in opposite sides of the casing 12, and these pistons set in motion the liquid which is contained in the pump chamber 29 and pipes 30 and 32, which liquid can be oil, glycerin, or other suitable material. The inlet to the chamber 29 is through the pipe 30 and the inflowing liquid comes in by the check valve 31, while the outgoing liquid passes the check valve 33 and goes out through the pipe 32. This arrangement is duplicated on opposite sides of the casing 12, and so there is a double series of transmission pipes 30 and 32 on the machine. Obviously the pump which I have just described can be varied greatly and any suitable circulating medium substituted without affecting the principle of the invention, and the particular arrangement of pipes can also be changed if desired, but the arrangement shown is practical, simple, and I believe novel.

The pipes 30 and 32 extend rearward from the pump chambers 29, as shown in Figs. 1 and 2, and they pass through the valve casing 34 and the valve therein, which will be presently described, and back to the second valve casing 35. Thence the flow is through the flexible pipes 36 to the inlet and outlet pipes 30ª and 32ª of the axle motor or gear pump 37, which latter comprises a suitable casing 38 which is divided by partitions 39 into two compartments, each of which contains the gear pistons 40 and 41, which mesh with each other and are mounted respectively on the idle shaft 42 and driving axle 43. The driving axle 43 is preferably divided in the casing 38 and has one tongue portion 44 on one part extending into a corresponding recess of the other part, as shown in Fig. 5, thus providing for the necessary compensation when turning a corner, and permitting one end of the axle to turn faster than the other. The axle extends through suitable stuffing boxes 45 on the ends of the casing 38. It will be noticed that as the liquid comes in through the pipe 32ª it will pass out through the pipe 30ª, and its flow will be toward the opposite sides of the casing 38 and up around the said sides to the pipe 30ª, thus turning the gear pistons 40 toward each other and turning the driving axle 43 normally forward. When the flow of liquid is reversed, as presently described, the direction of the pistons is also reversed, and the driving axle will of course then turn in the opposite direction.

To provide for taking the axle motor out easily when desired, the ends of the driving axle 43 can connect by a coupling 43ᵇ, as shown in Fig. 3, with the outer end portions of the axle 43, the latter connecting with the wheels as usual, and these portions 43ᶜ can be carried in sleeves 43ᵈ, while the latter connect by a yoke 43ᵉ.

It is desirable to have a certain amount of elasticity in the transmission liquid, and to this end I connect the cross pipes 30 and 32 by pipes 46, and these connect by the upright pipes 47 with the air chambers 48, which can be provided with removable stoppers, and through these the pipe system can be filled to the necessary extent when desired.

To provide for reversal without stopping the engine or motor, an ordinary plug valve 49 can be arranged in the casing 34 in opposite sides of the machine. This valve 49 can have a squared end 50, and this can connect by a crank 51 and pitman 52 with a lever 55, which can be fulcrumed as shown at 56, so that by tilting the lever the valve 49 can be turned. The lever 55 can connect with the pitmen 52 on opposite sides of the machine, if desired. The plug 49 has ports 57 which are normally open to permit the liquid to pass regularly through the pipes 30 and 32, and it also has branch ports 58 adapted to connect the pipes 30 and 32 with ports 59 and 59ª in the valve 49 and through these ports with the pipes 60 and 61 which cross as shown in Fig. 1 and connect with the ports 62 and 63 in the valve casing 35. These ports 62 and 63 connect with ports 64 and 65 in the valve casing 35, and the latter normally connect with ports 66 and 67 in the plug valve 68, and so when by the foot lever 55 the liquid is forced through the pipes 60 and 61, the course will be changed by the valve 49, and thus the flow through the axle motor will be changed.

Sometimes in slippery or rough going, it is desired to cut out one end of the axle motor, and to this end the valve 68 is provided with a by-pass port 69 arranged so that by turning the ports 66 and 67 out of registry with the ports 64 and 65, the liquid will flow from the axle motor through the by-pass, and back to the motor again, thus cutting out this end of the motor. The valve 68 has a squared end 70 to which a hand wrench 71 can be applied, as this valve will only be cut out occasionally.

As shown in Fig. 2ª a single pipe 30 can be used and this arranged to branch into two pipes 36 which are controlled by valves 35. It will be seen that this slight difference in arrangement makes no difference in the result, as the operation is the same as in the structure shown in Fig. 2.

From the foregoing description it will be seen that I have provided a flexible system of transmission by means of flowing liquids which cuts out the use of ordinary gears, chains, belts, etc., that I have provided a very positive means of circulating the liquid, of reversing the same, or of stopping the flow altogether, and while I claim the apparatus which I have shown as well adapted for the purpose, still I do not limit my invention to these details of construction.

Having thus fully described my invention, I claim as new and desire to secure by Letters Patent:—

1. An apparatus of the kind described, comprising a pump, a primary motor operating the pump, a secondary motor detachably coupled on its driving shaft or axle, and a system of circulation pipes connecting the secondary motor and the pump.

2. An apparatus of the kind described, comprising a pump, a motor for driving the pump, a shaft or axle having a yoke connecting its adjacent parts, a secondary motor detachably coupled to the ends of the shaft or axle, and circulation pipes connecting the secondary motor and the pump.

3. In apparatus of the character described, an engine, a pump driven by said engine, an axle, a motor mounted upon the axle, and pipes connecting said pump to said motor, said pump having opposed cylinders, pistons therein, a block on the shaft of said engine, an eccentric slidable on said block, two straps on said eccentric and arms connecting one strap with each piston.

4. In an apparatus of the character described, the combination with an engine, a pump driven by said engine, an axle, a motor pump mounted upon the axle, pipes connecting said pump to said motor, said pump having opposed cylinders, pistons therein, a block on the shaft of said engine, an eccentric slidable on said block, and means connecting said eccentric and said pistons, of means for sliding said block within said eccentric, a foot lever for controlling said means, valves in the pipe for controlling the flow of liquid therethrough, and a foot lever controlling said valves.

JACOB A. BAAB.

Witnesses:
WARREN B. HUTCHINSON,
JOS. F. A. O'DONNELL.